US010850890B2

(12) United States Patent
Pefley et al.

(10) Patent No.: US 10,850,890 B2
(45) Date of Patent: Dec. 1, 2020

(54) ORGANIZATIONAL CLASP FOR COOLER

(71) Applicant: Happy Cub LLC, West Falls, NY (US)

(72) Inventors: Tarinee Pefley, West Falls, NY (US); Everett Pefley, West Falls, NY (US)

(73) Assignee: Happy Cub LLC, West Falls, NY (US)

( * ) Notice: Subject to any disclaimer, the term of this patent is extended or adjusted under 35 U.S.C. 154(b) by 0 days.

(21) Appl. No.: 16/223,913

(22) Filed: Dec. 18, 2018

(65) Prior Publication Data

US 2020/0189794 A1  Jun. 18, 2020

(51) Int. Cl.
| | | |
|---|---|---|
| *F16M 13/02* | (2006.01) | |
| *F16B 2/10* | (2006.01) | |
| *F25D 3/08* | (2006.01) | |
| *B65D 25/10* | (2006.01) | |
| *B65D 43/16* | (2006.01) | |
| *B65D 25/20* | (2006.01) | |

(52) U.S. Cl.
CPC .............. *B65D 25/10* (2013.01); *F16B 2/10* (2013.01); *F25D 3/08* (2013.01); *B65D 25/20* (2013.01); *B65D 43/16* (2013.01); *F16M 13/022* (2013.01)

(58) Field of Classification Search
CPC ........ B65D 25/10; B65D 25/20; B65D 43/16; F16B 2/10; F25D 3/08; F16L 3/12; F16L 3/13; F16L 3/08; F16L 3/223; H02G 3/32; H02G 3/263; F16M 13/022; B60N 3/10
USPC ............. 248/231.51, 100, 101, 316.7, 316.5; 220/592.2; 24/455, 543
See application file for complete search history.

(56) References Cited

U.S. PATENT DOCUMENTS

| | | | | |
|---|---|---|---|---|
| 2,650,948 | A | * | 9/1953 | Findlay ................. F16L 3/2235 174/168 |
| 4,325,526 | A | * | 4/1982 | Kitagawa .................. F16L 3/23 24/336 |
| 4,881,705 | A | * | 11/1989 | Kraus ....................... F16L 3/08 248/74.2 |
| 4,919,374 | A |   | 4/1990 | Julian |
| 4,946,065 | A |   | 8/1990 | Goulter et al. |
| 4,962,573 | A |   | 10/1990 | Breveglieri |
| 5,060,810 | A | * | 10/1991 | Jones .................... A47F 7/0035 211/4 |
| 5,222,704 | A |   | 6/1993 | Light |
| 5,257,768 | A | * | 11/1993 | Juenemann ........... F16L 55/035 248/604 |
| 5,314,151 | A |   | 5/1994 | Carter-Mann |
| 5,735,495 | A |   | 4/1998 | Kubota |
| 5,887,748 | A |   | 3/1999 | Nguyen |
| 5,915,584 | A |   | 6/1999 | Sposit et al. |

(Continued)

FOREIGN PATENT DOCUMENTS

GB            1500698        *   2/1978

*Primary Examiner* — Tan Le
(74) *Attorney, Agent, or Firm* — Simpson & Simpson, PLLC

(57) ABSTRACT

A clasp, including an inferior component, including a first surface, a first pad connected to the first surface, and a first buckle portion connected to the first surface, and a superior component displaceable relative to the inferior component, the superior component including a second surface, a second pad connected to the second surface, and a second buckle portion operatively arranged to engage the first buckle portion and secure the superior component to the inferior component, wherein in a fully closed position, the first pad and the second pad form a clamp.

19 Claims, 9 Drawing Sheets

(56) References Cited

U.S. PATENT DOCUMENTS

| | | | |
|---|---|---|---|
| 6,012,686 A | 1/2000 | Julian | |
| 6,176,455 B1 | 1/2001 | Ma | |
| 6,286,706 B1 | 9/2001 | Tucker | |
| 8,056,868 B2* | 11/2011 | Vander Griend | E05D 1/02 |
| | | | 24/455 |
| D655,150 S | 3/2012 | Alderman | |
| 8,164,449 B2 | 4/2012 | Van Tassel | |
| 8,215,595 B2* | 7/2012 | Li | H02G 3/32 |
| | | | 248/314 |
| 8,561,950 B2* | 10/2013 | Li | H02G 3/32 |
| | | | 248/73 |
| 9,453,593 B2* | 9/2016 | Pearson | F16L 3/223 |
| 2015/0253584 A1* | 9/2015 | Pond | G02C 3/02 |
| | | | 24/13 |
| 2019/0092528 A1* | 3/2019 | Slattery | F16M 13/022 |

\* cited by examiner

ORGANIZATIONAL CLASP FOR COOLER

FIELD

The present disclosure relates to bag holding devices for containers, and more particularly, to an organizational clasp for holding bags within a cooler which may contain ice.

BACKGROUND

Standard coolers known in the art are generally box shaped and include a floor, a lateral wall connected to the floor, and a top hingedly connected to the lateral side. There are no organizational features within standard coolers. Often times, a cooler is packed simply by loading in the material which the user wishes to remain cold, and then loading ice thereon. However, once the material is covered with ice, it is difficult to find specific items therein due to lack of visibility. This leads to the user searching through the contents of the cooler with the hand substantially submerged in ice throughout that time.

Thus, there is a long felt need for organizational clasps that can be implemented in a cooler to hold the tops of bags, the bottoms of which are submerged in or arranged substantially proximate to the ice, which can easily be identified so the user can access the contents therein.

SUMMARY

According to aspects illustrated herein, there is provided a clasp, comprising an inferior component, including a first surface, a first pad connected to the first surface, and a first buckle portion connected to the first surface, and a superior component displaceable relative to the inferior component, the superior component including a second surface, a second pad connected to the second surface, and a second buckle portion operatively arranged to engage the first buckle portion and secure the superior component to the inferior component, wherein in a fully closed position, the first pad and the second pad form a clamp.

According to aspects illustrated herein, there is provided a cooler comprising a lateral wall and at least one clasp connected to the lateral wall for securing a bag therein, the at least one clasp, comprising an inferior component, including a first surface connected to the lateral wall, a first pad connected to the first surface, and a first buckle portion connected to the first surface, and a superior component pivotable relative to the inferior component, the superior component including a second surface, a second pad connected to the second surface, and a second buckle portion operatively arranged to engage the first buckle portion and secure the superior component to the inferior component, wherein in a fully closed position, the first pad and the second pad form a clamp for securing the bag.

These and other objects, features, and advantages of the present disclosure will become readily apparent upon a review of the following detailed description of the disclosure, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

Figure 1A:
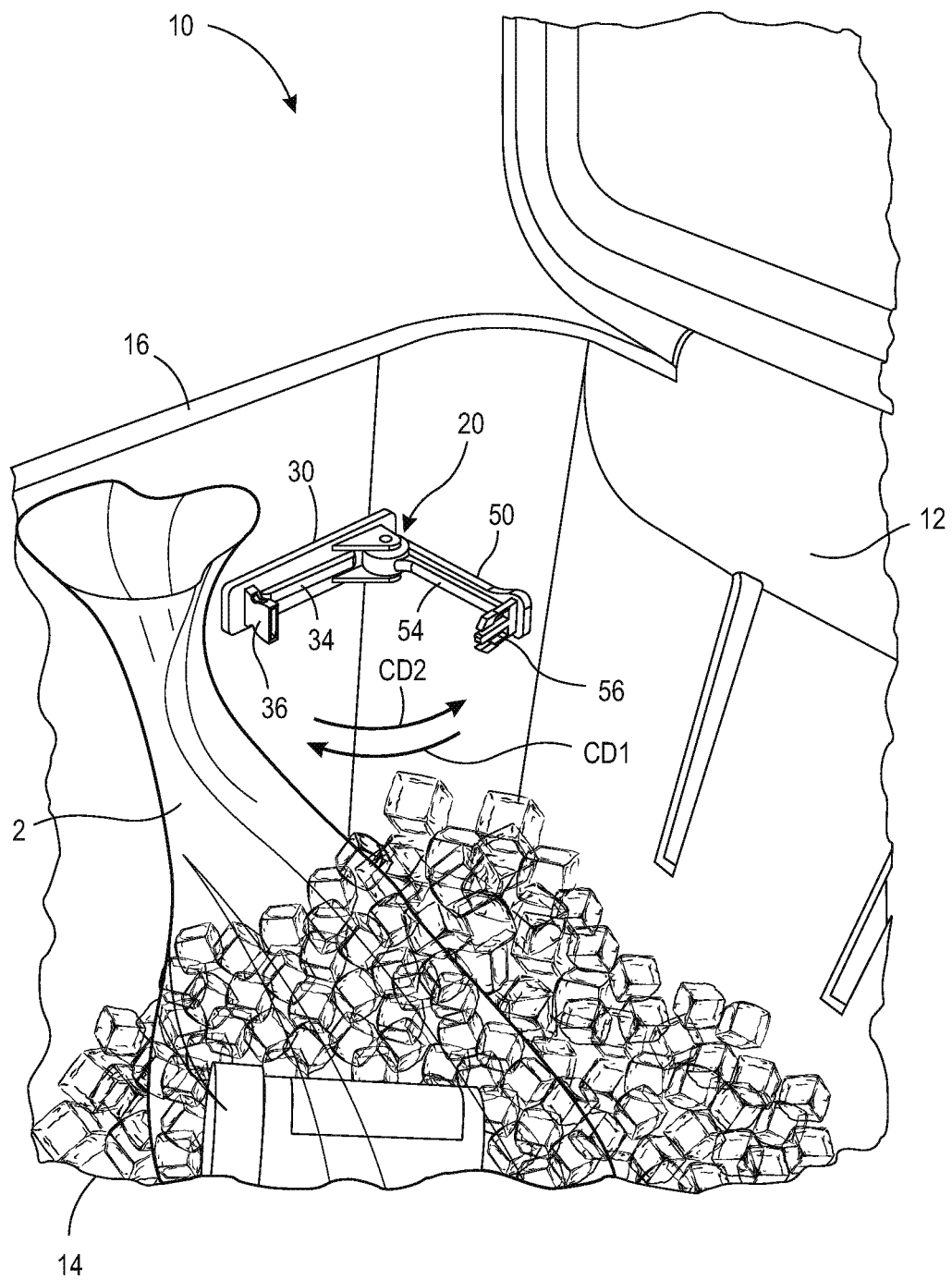
FIG. 1A is a perspective view of a container with a clasp in an opened position.

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments. The assembly of the present disclosure could be driven by hydraulics, electronics, pneumatics, and/or springs.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

By "non-rotatably connected" elements, we mean that: the elements are connected so that whenever one of the elements rotate, all the elements rotate; and relative rotation between the elements is not possible. Radial and/or axial movement of non-rotatably connected elements with respect to each other is possible, but not required. By "rotatably connected" elements, we mean that the elements are rotatable with respect to each other.

The term "inferior component" as used in the present disclosure is intended to mean the component of the clasp which is mounted or intended to be mounted to the container or cooler. The term "superior component" as used in the present disclosure is intended to mean the component of the clasp which is rotatable with respected to the mounted inferior component. It should be appreciated, however, that in some embodiments the superior component may be mounted to the container or cooler and the inferior component is rotatable relative to the mounted superior component.

The term "clamp" as used in the present disclosure is intended to mean to hold tightly, or a device designed to bind or constrict or to press two or more parts together so as to hold them firmly, or any of various instruments or appliances having parts brought together for holding or compressing something.

Figure 1B:
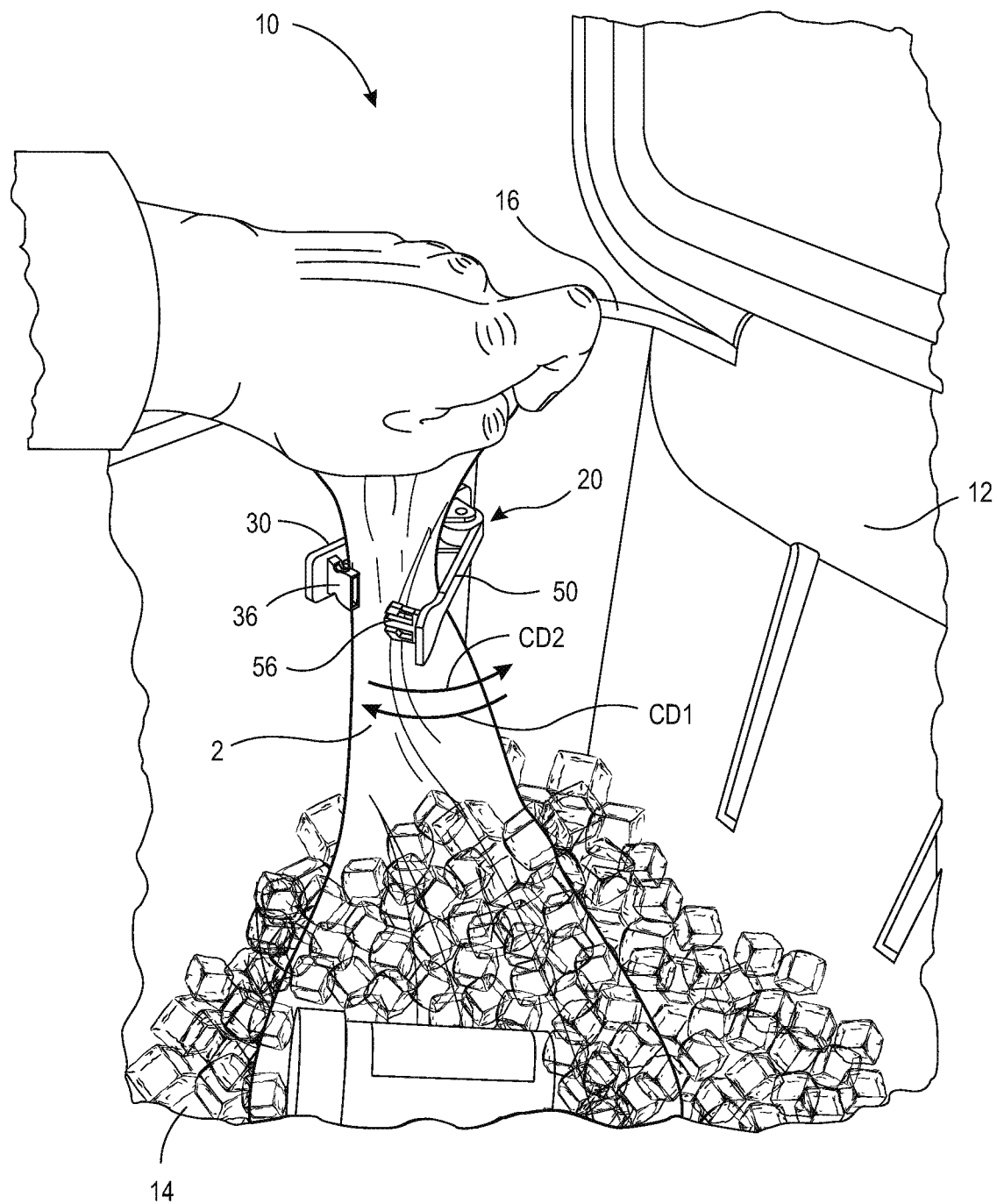
FIG. 1B is a perspective view of a container with a clasp in an opened position.
Figure 1C:
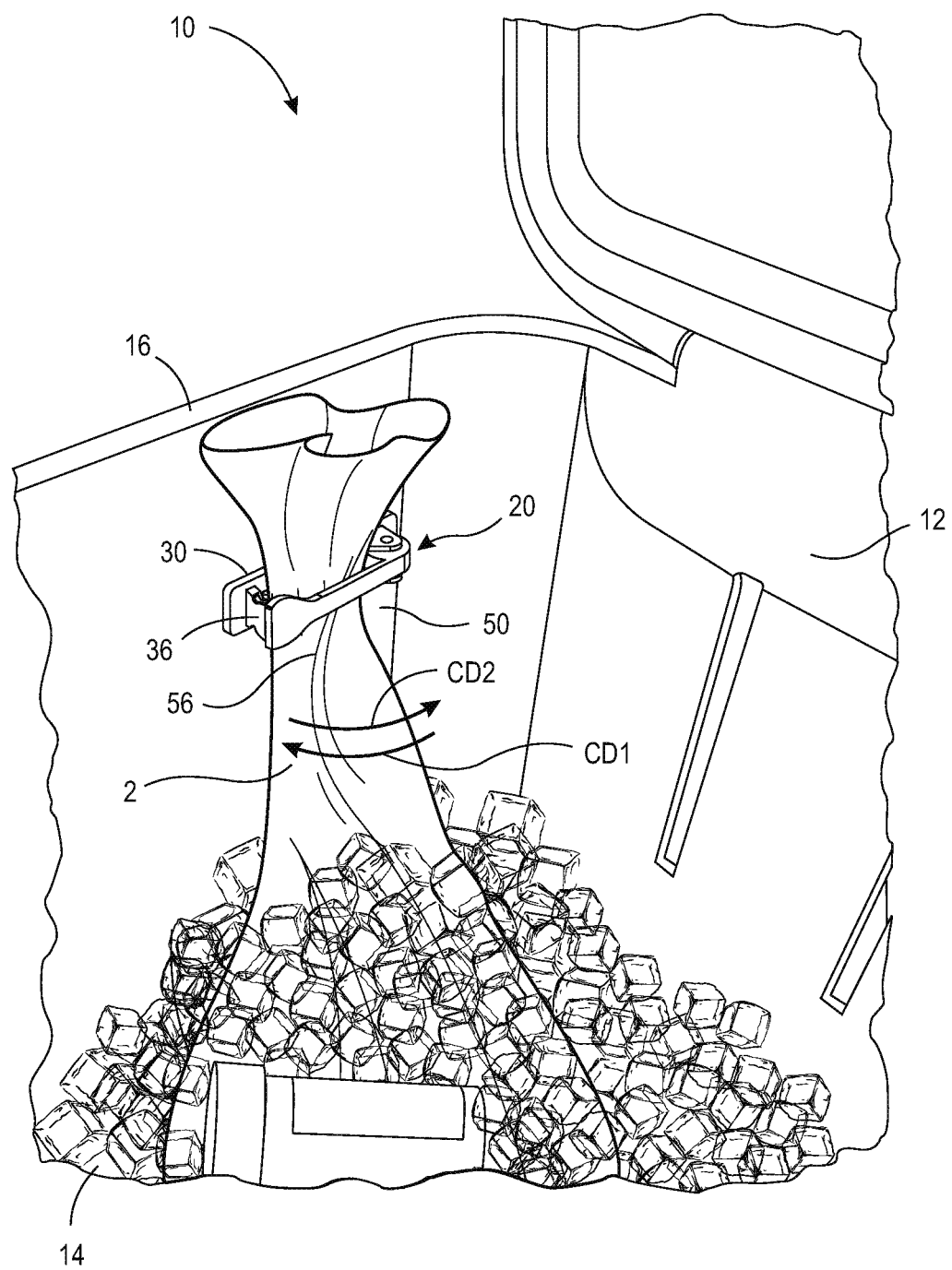
FIG. 1C is perspective view of a container with a clasp in a fully closed position.

Referring now to the figures, FIG. 1A is a perspective view of container 10 with clasp 20 in an opened position. FIG. 1B is a perspective view of container 10 with clasp 20 in an opened position. Container or cooler 10 generally comprises lateral wall 12, floor 14, edge 16, and one or more clasps connected to lateral wall 12. As shown in FIGS. 1A-C, clasp 20 is connected to lateral wall; however, it should be appreciated that clasps 120, 220, 320, 420, 520, or any other suitable clasp may be used in place of clasp 20. Furthermore, it should be appreciated that although only one clasp is shown connected to lateral wall 12 of container 10, any suitable number of clasps may be used therein (e.g., one or more clasps connected to lateral wall 12 of container 10), and that this disclosure should not be limited to the use of only one clasp. As shown in FIG. 1A, clasp 20 is in an open position to allow a user to insert the top end of bag 2 therein. Clasp 20 is preferably arranged on lateral wall 12 proximate edge 16 such that the top end of bag 2 can be clamped and the bottom end of bag 2 can hang down into or proximate to the ice in container 10. In FIG. 1B the top end of bag 2 is inserted in clasp 20 between superior component 50 and inferior component 30, and superior component 50 is being rotated in circumferential direction CD1 to "close" clasp 2.

FIG. 1C is perspective view of container 10 with clasp 20 in a fully closed position. In FIG. 1C, bag 2 is clamped in clasp 20. Specifically, buckle portion 56 has been secured in buckle portion 36 such that pads 54 and 34 abut against (or are arranged substantially proximate) each other, thereby squeezing bag 2 therebetween. Clasp 20 will be described in greater detail with respect to FIGS. 2A-B. As shown, bag 2 can hang down and rest on top of the ice or submerge at least partially in the ice.

Figure 2A:
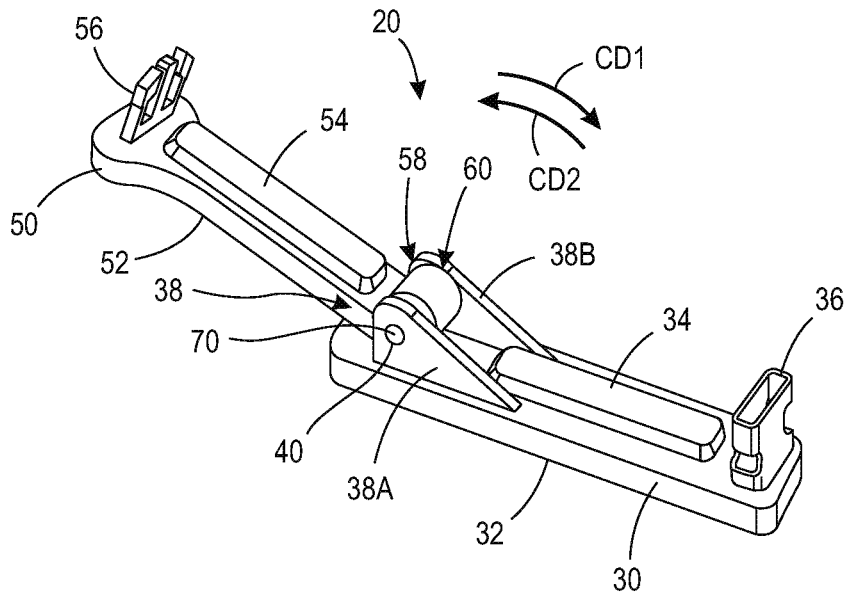
FIG. 2A is a perspective view of the clasp shown in FIG. 1A in an opened position.
Figure 2B:
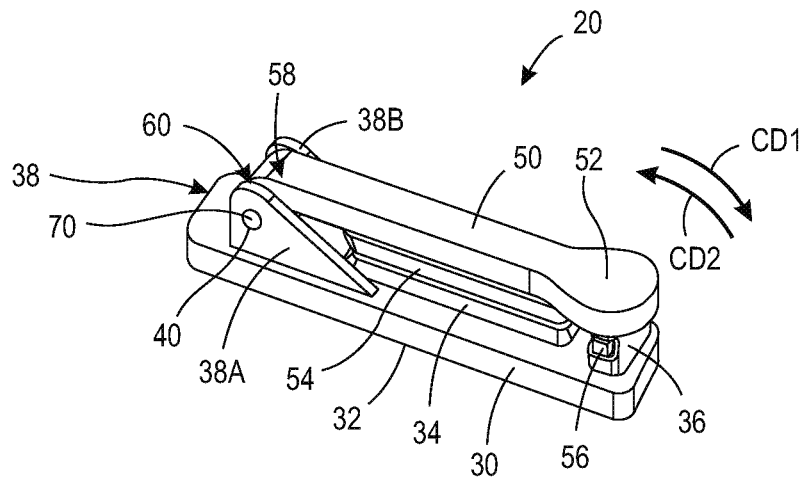
FIG. 2B is a perspective view of the clasp shown in FIG. 2A in a fully closed position.

FIG. 2A is a perspective view of clasp 20 in an opened position. FIG. 2B is a perspective view of clasp 20 in a fully closed position. Clasp 20 generally comprises inferior component 30 and superior component 50. Superior component 50 is hingedly connected to inferior component 30.

Inferior component 30 comprises surface 32, pad 34, buckle portion 36, and hinge portion 38. Inferior component 30 is operatively arranged to be connected to lateral wall 12 of container 10 via surface 32. In some embodiment, inferior component 30 is operatively arranged to be connected to lateral wall 12 via double-sided tape, adhesives, screws, rivets, bolts, nails, hook and loop fastener, etc. In some embodiments, inferior component 30 is integrally formed with lateral wall 12 (i.e., molded into container 10 itself). In some embodiments, lateral wall 12 comprises a slot in which inferior component 30 is operatively arranged to engage to connect clasp 20 to container 10. In such embodiments, clasps 20 are removably connected to container 10. Pad 34 is arranged to clamp bag 2. In some embodiments, pad 34 is an integrated (molded) textured protrusion. In some embodiments, pad 34 comprises silicone, rubber, and/or foam. In some embodiments, pad 34 comprises a molded protrusion having a coating comprising a rubber, silicone, or similar textured material, or any combination thereof, for gripping bag 2. Hinge portion 38 comprises flanges 38A and 38B. Through-bore 40 extends through both flanges 38A and 38B. In some embodiments, buckle portion 36 comprises a parachute buckle.

Superior component 50 comprises surface 52, pad 54, buckle portion 56, and hinge portion 58. Superior component 50 is hingedly connected to inferior component 30. In some embodiments, superior component 50 is pivotably connected to inferior component 30. Pad 54 is arranged to clamp bag 2. In some embodiments, pad 54 is an integrated (molded) textured protrusion. In some embodiments, pad 54 comprises silicone, rubber, and/or foam. In some embodiments, pad 54 comprises a molded protrusion having a coating comprising a rubber, silicone, or similar textured material, or any combination thereof, for gripping bag 2. Hinge portion 58 comprises through-bore 60 (not shown) and is arranged between flanges 38A and 38B. Pin 70 extends through through-bore 40 of flanges 38A and 38B and through-bore 60 (not shown) to form a hinged connection between superior component 50 and inferior component 30. In some embodiments, buckle portion 56 comprises a parachute buckle. Buckle portion 56 is arranged to engage buckle portion 36 to lock superior component 50 with inferior component 30. When in the fully closed or locked position, pad 54 abuts against or is arranged substantially proximate to pad 34, thereby locking a bag therebetween.

Figure 3A:
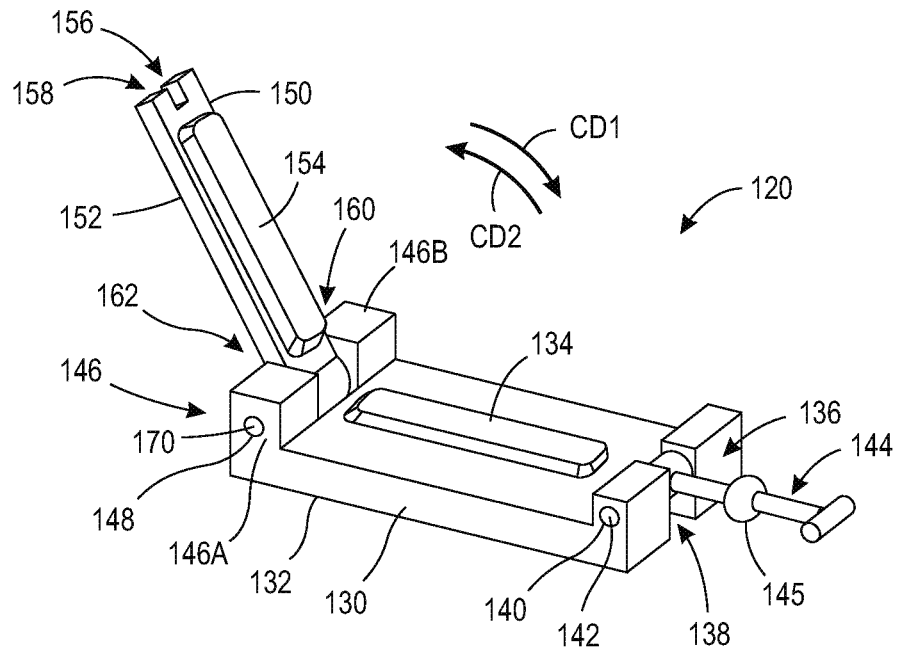
FIG. 3A is a perspective view of a clasp in an opened position.
Figure 3B:
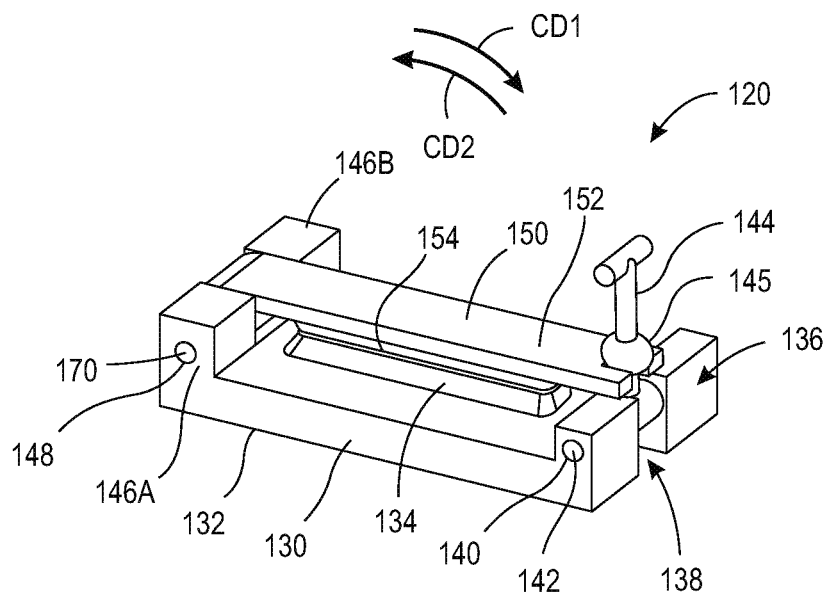
FIG. 3B is a perspective view of the clasp shown in FIG. 3A in a fully closed position.

FIG. 3A is a perspective view of clasp 120 in an opened position. FIG. 3B is a perspective view of clasp 120 in a fully closed position. Clasp 120 generally comprises inferior component 130 and superior component 150. Superior component 150 is hingedly connected to inferior component 130.

Inferior component 130 comprises surface 132, pad 134, buckle portion 136, and hinge portion 146. Inferior component 130 is operatively arranged to be connected to lateral wall 12 of container 10 via surface 132. In some embodiment, inferior component 130 is operatively arranged to be connected to lateral wall 12 via double-sided tape, adhesives, screws, rivets, bolts, nails, hook and loop fastener, etc. In some embodiments, inferior component 130 is integrally formed with lateral wall 12 (i.e., molded into container 10 itself). In some embodiments, lateral wall 12 comprises a slot in which inferior component 130 is operatively arranged to engage to connect clasp 120 to container 10. In such embodiments, clasps 120 are removably connected to container 10. Pad 134 is arranged to clamp bag 2. In some embodiments, pad 134 is an integrated (molded) textured protrusion. In some embodiments, pad 134 comprises silicone, rubber, and/or foam. In some embodiments, pad 134 comprises a molded protrusion having a coating comprising a rubber, silicone, or similar textured material, or any combination thereof, for gripping bag 2. Hinge portion 146 comprises flanges 146A and 146B. Through-bore 148 extends through both flanges 146A and 146B. Buckle portion 136 comprises slot 138 and tension buckle 144. Tension buckle 144 is connected to inferior component 130 via pin 142 which extends through through-bore 140. In some embodiments, tension buckle 144 is hingedly connected to inferior component 130. In some embodiments, tension buckle 144 is pivotably connected to inferior component 130. Tension buckle 144 comprises enlarged portion 145 which is arranged to engage surface 152 and slot 158 of superior component 150, as will be discussed in greater detail below. Tension buckle 144 comprises an elastic material such that it can be stretched or deformed and return to its original shape.

Superior component 150 comprises surface 152, pad 154, buckle portion 156, and hinge portion 160. Superior component 150 is hingedly connected to inferior component 130. In some embodiments, superior component 150 is pivotably connected to inferior component 130. Pad 154 is arranged to clamp bag 2. In some embodiments, pad 154 is an integrated (molded) textured protrusion. In some embodiments, pad 154 comprises silicone, rubber, and/or foam. In some embodiments, pad 154 comprises a molded protrusion having a coating comprising a rubber, silicone, or similar textured material, or any combination thereof, for gripping bag 2. Hinge portion 160 comprises through-bore 162 (not shown) and is arranged between flanges 146A and 146B. Pin 170 extends through through-bore 148 of flanges 146A and 146B and through-bore 162 (not shown) to form a hinged connection between superior component 150 and inferior component 130. Buckle portion 156 is operatively arranged to engage buckle portion 136 to lock superior component 150 with inferior component 130. When in the fully closed or locked position, pad 154 abuts against or is arranged substantially proximate to pad 134, thereby locking a bag therebetween. Specifically, superior component 150 is displaced in circumferential direction CD1 until pad 154 abuts against or is arranged substantially proximate to pad 134. Tension buckle 144 is then rotated in circumferential direction CD2 toward slot 158. Tension buckle 144 is stretched or elongated until enlarged portion 145 clears surface 152, at which point tension buckle 144 is rotated further in circumferential direction CD2 until tension buckle 144 engages slot 158. Tension buckle 144 is then released and the elasticity of tension buckle 144 pulls enlarged portion 145 against surface 152 thus clamping superior component 150 to inferior component 130.

Figure 4A:
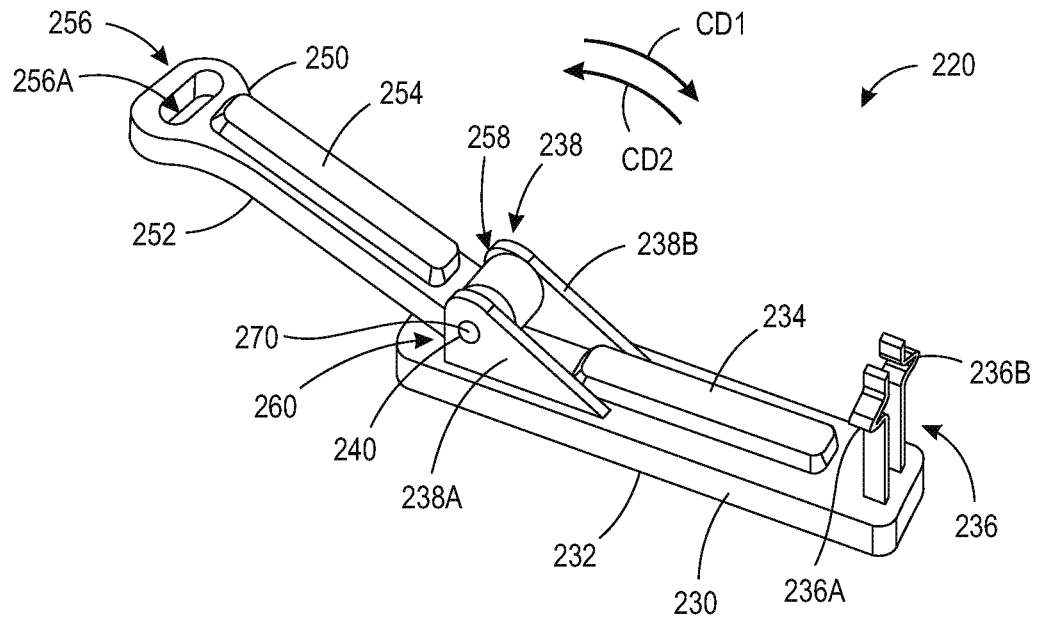
FIG. 4A is a perspective view of a clasp in an opened position.
Figure 4B:
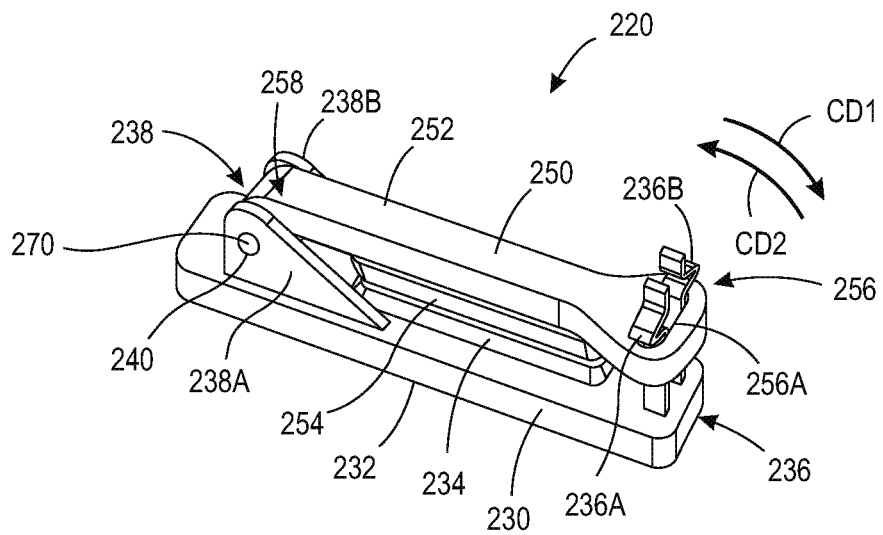
FIG. 4B is a perspective view of the clasp shown in FIG. 4A in a fully closed position.

FIG. 4A is a perspective view of clasp 220 in an opened position. FIG. 4B is a perspective view of clasp 220 in a fully closed position. Clasp 220 generally comprises inferior component 230 and superior component 250. Superior component 250 is hingedly connected to inferior component 230.

Inferior component 230 comprises surface 232, pad 234, buckle portion 236, and hinge portion 238. Inferior component 230 is operatively arranged to be connected to lateral wall 12 of container 10 via surface 232. In some embodiment, inferior component 230 is operatively arranged to be connected to lateral wall 12 via double-sided tape, adhesives, screws, rivets, bolts, nails, hook and loop fastener, etc. In some embodiments, inferior component 230 is integrally formed with lateral wall 12 (i.e., molded into container 10 itself). In some embodiments, lateral wall 12 comprises a slot in which inferior component 230 is operatively arranged to engage to connect clasp 220 to container 10. In such embodiments, clasps 220 are removably connected to container 10. Pad 234 is arranged to clamp bag 2. In some embodiments, pad 234 is an integrated (molded) textured protrusion. In some embodiments, pad 234 comprises silicone, rubber, and/or foam. In some embodiments, pad 234 comprises a molded protrusion having a coating comprising a rubber, silicone, or similar textured material, or any combination thereof, for gripping bag 2. Hinge portion 238 comprises flanges 238A and 238B. Through-bore 240 extends through both flanges 238A and 238B. Buckle portion 236 comprises spring portions 236A and 236B which are arranged to engage buckle portion 256, specifically slot 256A, of superior component 250, as will be discussed in greater detail below. Spring portions 236A and 236B comprise an elastic material such that they are capable of deforming and returning to their original shape. Each of spring portions 236A and 236B comprise a ramp portion, which when engaged by slot 256, forces spring portions 236A and 236B toward each other. The ramp portions may be linear or curvilinear.

Superior component 250 comprises surface 252, pad 254, buckle portion 256, and hinge portion 258. Superior component 250 is hingedly connected to inferior component 230. In some embodiments, superior component 250 is pivotably connected to inferior component 230. Pad 254 is arranged to clamp bag 2. In some embodiments, pad 254 is an integrated (molded) textured protrusion. In some embodiments, pad 254 comprises silicone, rubber, and/or foam. In some embodiments, pad 254 comprises a molded protrusion having a coating comprising a rubber, silicone, or similar textured material, or any combination thereof, for gripping bag 2. Hinge portion 258 comprises through-bore 260 (not shown) and is arranged between flanges 238A and 238B. Pin 270 extends through through-bore 240 of flanges 238A and 238B and through-bore 260 (not shown) to form a hinged connection between superior component 250 and inferior component 230. Buckle portion 256 comprises slot 256A. Buckle portion 256 is arranged to engage buckle portion 236 to lock superior component 250 with inferior component 230. When in the fully closed or locked position, pad 254 abuts against or is arranged substantially proximate to pad 234, thereby locking a bag therebetween. Specifically, superior component 250 is displaced in circumferential direction CD1 until pad 254 abuts against or is arranged substantially proximate to pad 234. As buckle portion 256 engages buckle portion 236, the edges of slot 256A engage the ramp portion of spring portions 236A and 236B thereby forcing them towards each other. When fully closed, the shoulder surfaces of the ramp portions of spring portions 236A and 236B abut against or are arranged substantially proximate surface 252 thereby circumferentially locking superior component 250 with respect to inferior component 230. To unlock clasp 220, spring portions 236A and 236B are "squeezed" together until the shoulder surfaces of the ramp portions of spring portions 236A and 236B clear the edges of slot 256A, thus enabling superior component 250 to be displaced in circumferential direction CD2.

Figure 5A:
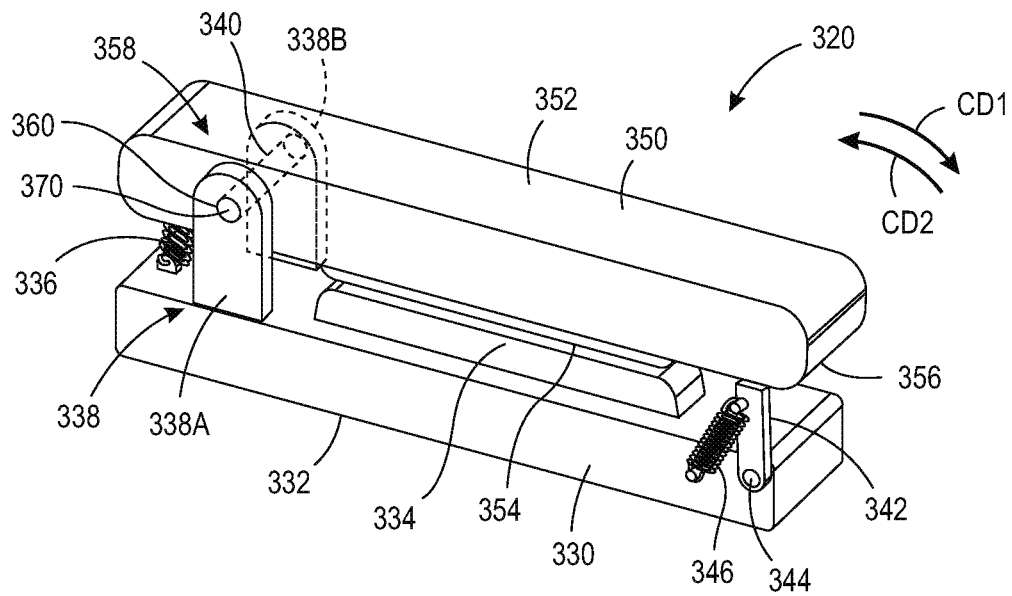
FIG. 5A is a perspective view of a clasp in an opened position.
Figure 5B:
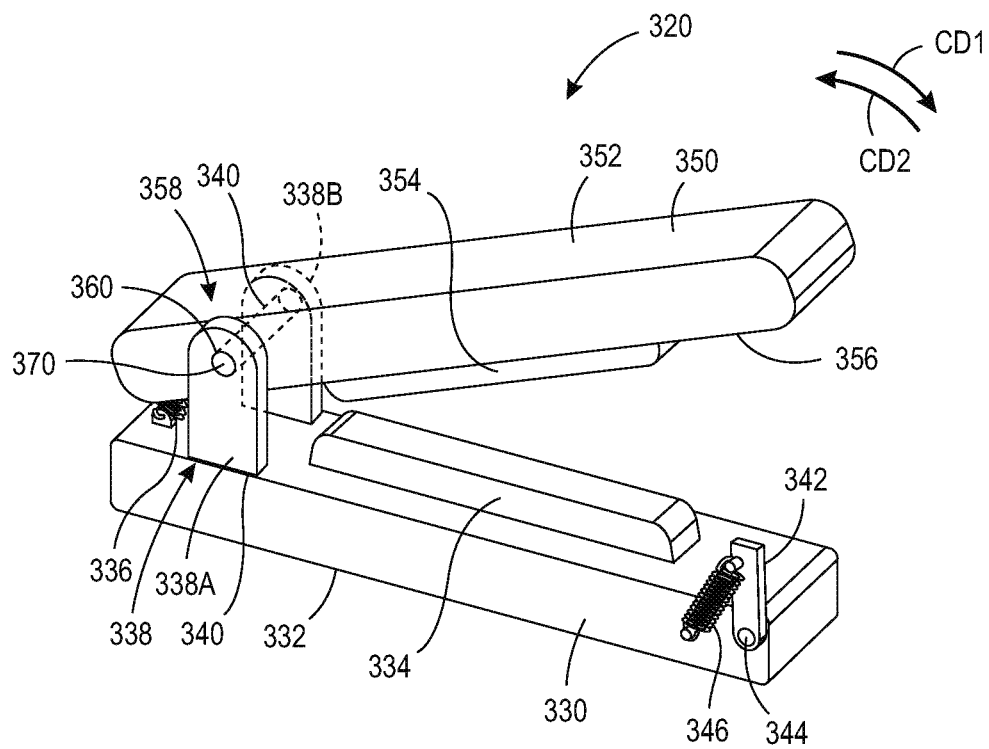
FIG. 5B is a perspective view of the clasp shown in FIG. 5A in a fully closed position.

FIG. 5A is a perspective view of clasp 320 in an opened position. FIG. 5B is a perspective view of clasp 320 in a fully closed position. Clasp 320 generally comprises inferior component 330, superior component 350, and spring 336. Superior component 350 is hingedly connected to inferior component 330.

Inferior component 330 comprises surface 332, pad 334, and hinge portion 338. Inferior component 330 is operatively arranged to be connected to lateral wall 12 of container 10 via surface 332. In some embodiment, inferior component 330 is operatively arranged to be connected to lateral wall 12 via double-sided tape, adhesives, screws, rivets, bolts, nails, hook and loop fastener, etc. In some embodiments, inferior component 330 is integrally formed with lateral wall 12 (i.e., molded into container 10 itself). In some embodiments, lateral wall 12 comprises a slot in which inferior component 330 is operatively arranged to engage to connect clasp 320 to container 10. In such embodiments, clasps 320 are removably connected to container 10. Pad 334 is arranged to clamp bag 2. In some embodiments, pad 334 is an integrated (molded) textured protrusion. In some embodiments, pad 334 comprises silicone, rubber, and/or foam. In some embodiments, pad 334 comprises a molded protrusion having a coating comprising a rubber, silicone, or similar textured material, or any combination thereof, for gripping bag 2. Hinge portion 338 comprises flanges 338A and 338B. Through-bore 340 extends through both flanges 338A and 338B. In some embodiments, clasp 320 further comprises flange 342. Flange 342 is hingedly or pivotably connected to inferior component 330 via pin 344 and spring 346. Flange 342 is operatively arranged to displace in circumferential direction CD2 such that a bag can be forced into clasp 320 in a closed position, or circumferential direction CD1 such that a bag can be forced out of clasp 320 in a closed position. After being displaced, spring 346 returns flange 342 to its original position. It should be appreciated that such a retention flange (i.e., flange 342) may be implemented on any of the clasps described herein.

Superior component 350 comprises surface 352, pad 354, and hinge portion 358. Superior component 350 is hingedly connected to inferior component 330. In some embodiments, superior component 350 is pivotably connected to inferior component 330. Pad 354 is arranged to clamp bag 2. In some embodiments, pad 354 is an integrated (molded) textured protrusion. In some embodiments, pad 354 comprises silicone, rubber, and/or foam. In some embodiments, pad 354 comprises a molded protrusion having a coating comprising a rubber, silicone, or similar textured material, or any combination thereof, for gripping bag 2. Hinge portion 358 comprises through-bore 360 (not shown) and is arranged between flanges 338A and 338B. Pin 370 extends through through-bore 340 of flanges 338A and 338B and through-bore 360 (not shown) to form a hinged connection between superior component 350 and inferior component 330. Spring 336 is arranged between and connected to superior component 350 and inferior component 330. Spring 336 is operatively arranged proximate hinge portions 338 and 358, as shown, to urge superior component 350 in circumferential direction CD1 or toward a closed position. When in the fully closed or locked position, pad 354 abuts against or is arranged substantially proximate to pad 334, thereby locking a bag therebetween. As such, clasp 320 will remain in the fully closed position until a user displaces superior component 350 in circumferential direction CD2. A user may displace superior component 350 in circumferential direction CD2, place the top end of bag 2 between pads 354 and 334, and then release superior component 350 which will "snap" back to the closed position, thereby locking bag 2 therebetween.

Figure 6A:
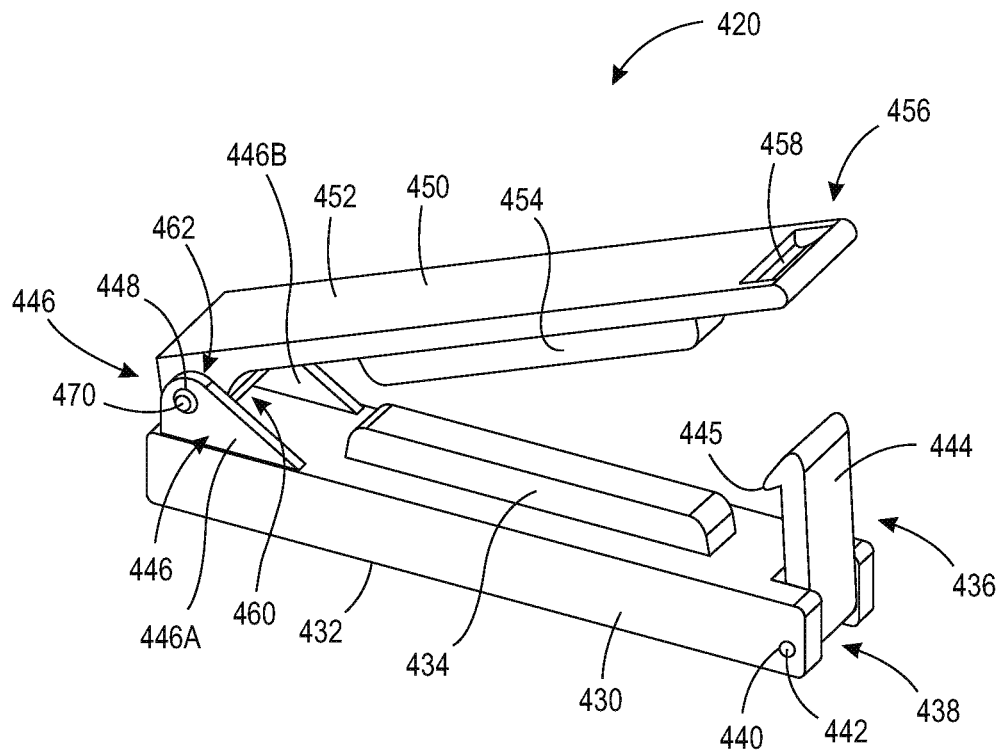
FIG. 6A is a perspective view of a clasp in an opened position.
Figure 6B:
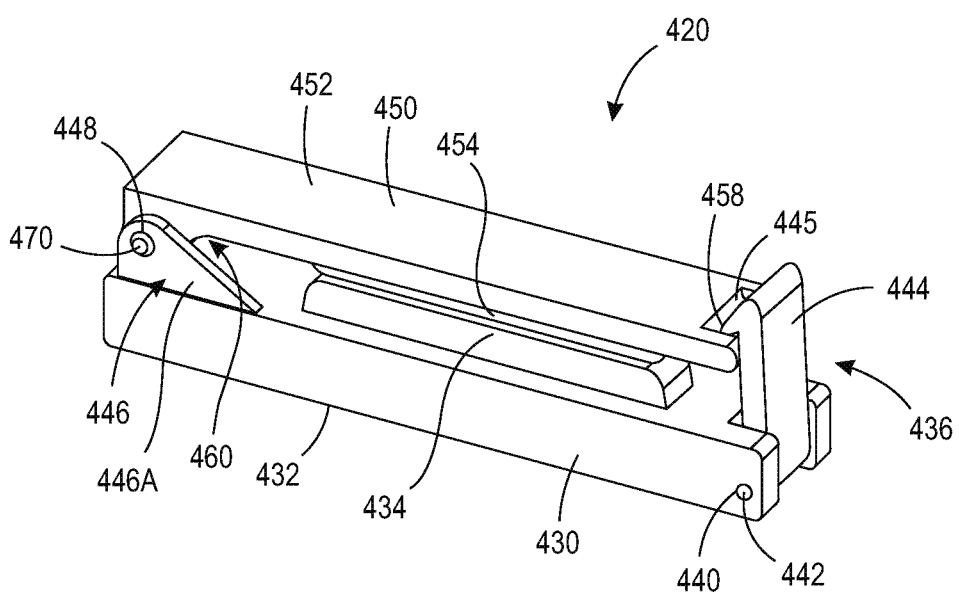
FIG. 6B is a perspective view of the clasp shown in FIG. 6A in a fully closed position.

FIG. 6A is a perspective view of clasp 420 in an opened position. FIG. 6B is a perspective view of clasp 420 in a fully closed position. Clasp 420 generally comprises inferior component 430 and superior component 450. Superior component 450 is hingedly connected to inferior component 430.

Inferior component 430 comprises surface 432, pad 434, buckle portion 436, and hinge portion 446. Inferior component 430 is operatively arranged to be connected to lateral wall 12 of container 10 via surface 432. In some embodiment, inferior component 430 is operatively arranged to be connected to lateral wall 12 via double-sided tape, adhesives, screws, rivets, bolts, nails, hook and loop fastener, etc. In some embodiments, inferior component 430 is integrally formed with lateral wall 12 (i.e., molded into container 10 itself). In some embodiments, lateral wall 12 comprises a slot in which inferior component 430 is operatively arranged to engage to connect clasp 420 to container 10. In such embodiments, clasps 420 are removably connected to container 10. Pad 434 is arranged to clamp bag 2. In some embodiments, pad 434 is an integrated (molded) textured protrusion. In some embodiments, pad 434 comprises silicone, rubber, and/or foam. In some embodiments, pad 434 comprises a molded protrusion having a coating comprising a rubber, silicone, or similar textured material, or any combination thereof, for gripping bag 2. Hinge portion 446 comprises flanges 446A and 446B. Through-bore 448 extends through both flanges 446A and 446B. Buckle portion 436 comprises slot 438 and tension hook 444. Tension hook 444 is connected to inferior component 430 via pin 442 which extends through through-bore 440. In some embodiments, tension hook 444 is hingedly connected to inferior component 430. In some embodiments, tension hook 444 is pivotably connected to inferior component 430. Tension hook 444 comprises protrusion 445 which is arranged to engage surface 452 and notch 458 of superior component 450, as will be discussed in greater detail below. In some embodiments, tension hook 444 at least partially comprises an elastic material such that it can be stretched or deformed and return to its original shape.

Superior component 450 comprises surface 452, pad 454, buckle portion 456, and hinge portion 460. Superior component 450 is hingedly connected to inferior component 430. In some embodiments, superior component 450 is pivotably connected to inferior component 430. Pad 454 is arranged to clamp bag 2. In some embodiments, pad 454 is an integrated (molded) textured protrusion. In some embodiments, pad 454 comprises silicone, rubber, and/or foam. In some embodiments, pad 454 comprises a molded protrusion having a coating comprising a rubber, silicone, or similar textured material, or any combination thereof, for gripping bag 2. Hinge portion 460 comprises through-bore 462 (not shown) and is arranged between flanges 446A and 446B. Pin 470 extends through through-bore 448 of flanges 446A and 446B and through-bore 462 (not shown) to form a hinged connection between superior component 450 and inferior component 430. Buckle portion 456 is operatively arranged to engage buckle portion 436 to lock superior component 450 with inferior component 430. When in the fully closed or locked position, pad 454 abuts against or is arranged substantially proximate to pad 434, thereby locking a bag therebetween. Specifically, superior component 450 is displaced in circumferential direction CD1 until pad 454 abuts against or is arranged substantially proximate to pad 434. Tension hook 444 is then rotated in circumferential direction CD2 toward notch 458. Tension hook 444, specifically protrusion 445, engages surface 452 and notch 458. The elasticity of tension hook 444 allows tension hook 444 to displace while engaging surface 452 until protrusion 445 "snaps" into notch 458, thus clamping superior component 450 to inferior component 430.

Figure 7A:
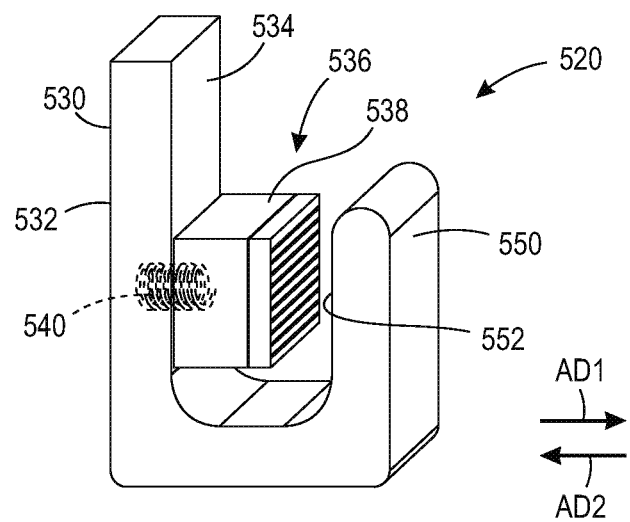
FIG. 7A is a perspective view of a clasp in an opened position.
Figure 7B:
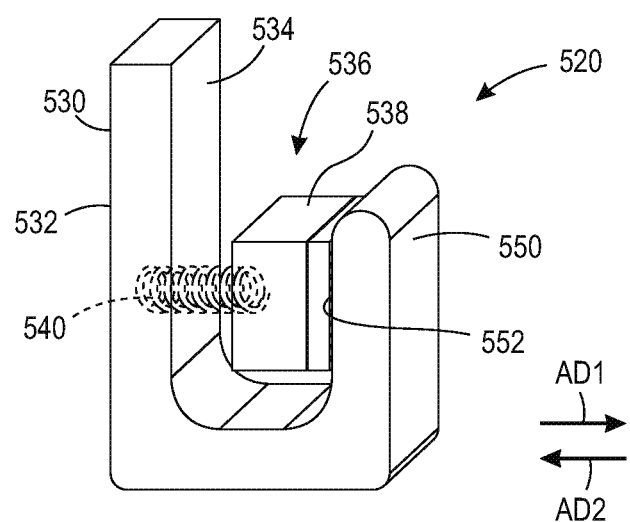
FIG. 7B is a perspective view of the clasp shown in FIG. 7A in a fully closed position.

FIG. 7A is a perspective view of clasp 520 in an opened position. FIG. 7B is a perspective view of clasp 520 in a fully closed position. Clasp 520 generally comprises inferior component 530, superior component 550, and space 536 arranged between inferior component 530 and superior component 550.

Inferior component 530 comprises surface 532, surface 534, pad 538, and spring 540. Inferior component 530 is operatively arranged to be connected to lateral wall 12 of container 10 via surface 532. In some embodiment, inferior component 530 is operatively arranged to be connected to lateral wall 12 via double-sided tape, adhesives, screws, rivets, bolts, nails, hook and loop fastener, etc. In some embodiments, inferior component 353 is integrally formed with lateral wall 12 (i.e., molded into container 10 itself). In some embodiments, lateral wall 12 comprises a slot in which inferior component 530 is operatively arranged to engage to connect clasp 520 to container 10. In such embodiments, clasps 520 are removably connected to container 10. Pad 538 is arranged to clamp bag 2. In some embodiments, pad 538 is an integrated (molded) textured component. In some embodiments, pad 538 comprises silicone, rubber, and/or foam. In some embodiments, pad 538 comprises a molded component having a coating comprising a rubber, silicone, or similar textured material, or any combination thereof, for gripping bag 2. Pad 538 is connected to surface 532 via spring 540. Spring 540 is arranged to urge pad 538 in axial direction AD1 toward surface 552 of superior component 550, as will be discussed in greater detail below.

Superior component 550 comprises surface 552. Superior component 550 is fixedly secured to inferior component 530. Superior component 550 may further comprise a pad arranged on surface 552 (not shown) to clamp bag 2. In some embodiments, the pad arranged on surface 552 (not shown) is an integrated (molded) textured protrusion. In some embodiments, the pad arranged on surface 552 (not shown) comprises silicone, rubber, and/or foam. In some embodiments, the pad arranged on surface 552 (not shown) comprises a molded protrusion having a coating comprising a rubber, silicone, or similar textured material, or any combination thereof, for gripping bag 2. As previously discussed, spring 540 is arranged between superior component 550 and inferior component 530. Spring 540 is operatively arranged to urge pad 534 in axial direction AD1 toward a closed position as shown in FIG. 7B. When in the fully closed or locked position, pad 538 abuts against or is arranged substantially proximate to surface 552, thereby locking a bag therebetween. As such, clasp 520 will remain in the fully closed position until a user displaces pad 538 in axial direction AD2. A user may displace pad 538 in axial direction AD2, place the top end of bag 2 between pad 538 and surface 552, and then release pad 538 which will "snap" back to the closed position, thereby locking bag 2 therebetween.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

REFERENCE NUMERALS

2 Bag
10 Container (or cooler)
12 Lateral wall
14 Floor
16 Edge
20 Clasp
30 Inferior component
32 Surface
34 Pad
36 Buckle portion
38 Hinge portion
38A Flange
38B Flange
40 Through-bore
50 Superior component
52 Surface
54 Pad
56 Buckle portion
58 Hinge portion
60 Through-bore
70 Pin
120 Clasp
130 Inferior component
132 Surface
134 Pad
136 Buckle portion
138 Slot
140 Through-bore
142 Pin
144 Tension buckle
145 Enlarged portion
146 Hinge portion
146A Flange
146B Flange
148 Through-bore
150 Superior component
152 Surface
154 Pad
156 Buckle portion
158 Slot
160 Hinge portion
162 Through-bore
170 Pin
220 Clasp
230 Inferior component
232 Surface
234 Pad
236 Buckle portion
236A Spring portion
236B Spring portion
238 Hinge portion
238A Flange
238B Flange
240 Through-bore
250 Superior component
252 Surface
254 Pad
256 Buckle portion
256A Slot
258 Hinge portion
260 Through-bore
270 Pin
320 Clasp
330 Inferior component
332 Surface
334 Pad
336 Spring
338 Hinge portion
338A Flange
338B Flange
340 Through-bore
342 Flange
344 Pin
346 Spring
350 Superior component
352 Surface
354 Pad
356 Surface
358 Hinge portion
360 Through-bore
370 Pin
420 Clasp
430 Inferior component
432 Surface
434 Pad
436 Buckle portion
438 Slot 440 Through-bore
442 Pin
444 Tension hook
445 Protrusion
446 Hinge portion
446A Flange
446B Flange
448 Through-bore
450 Superior component
452 Surface
454 Pad
456 Buckle portion
458 Notch
460 Hinge portion
462 Through-bore
470 Pin
520 Clasp
530 Inferior component
532 Surface
534 Surface
536 Space
538 Pad
540 Spring
550 Superior component
552 Surface
AD1 Axial direction
AD2 Axial direction
CD1 Circumferential direction
CD2 Circumferential direction

What is claimed is:

1. A clasp for a cooler, comprising:
an inferior component, including:
a first planar inner surface;
a first outer surface;
a first completely planar pad connected to the first planar inner surface;
at least one flange having a first through-bore; and,
a first buckle portion connected to the first planar inner surface; and,
a superior component displaceable relative to the inferior component, the superior component including:
a second planar inner surface;
a second outer surface;
a second completely planar pad connected to the second planar inner surface;
a hinge portion having a second through-bore; and,
a second buckle portion operatively arranged to engage the first buckle portion and secure the superior component to the inferior component;
wherein:
a first pin engages the first and second through-bores to hingedly connect the superior component with the inferior component; and,
in a fully closed position, the first completely planar pad and the second completely planar pad form a clamp.

2. The clasp as recited in claim 1, wherein the first buckle portion comprises an elastic tension buckle including:
a first end pivotably connected to the inferior component via a pin;
a second end having a handle; and,
an enlarged portion arranged between the first end and the second end, the enlarged portion being wider than the first end.

3. The clasp as recited in claim 2, wherein the inferior component comprises a slot extending from the first planar inner surface to the first outer surface, and the first end of the tension buckle is arranged in the slot.

4. The clasp as recited in claim 2, wherein:
the superior component comprises a slot extending from the second planar inner surface to the second outer surface;
the first end is operatively arranged to engage the slot of the superior component; and,
the enlarged portion is operatively arranged to abut against the second outer surface to squeeze the inferior component and the superior component together.

5. The clasp as recited in claim 2, wherein in the fully closed position, the enlarged portion abuts against the second outer surface.

6. The clasp as recited in claim 1, wherein the first buckle portion comprises:
a first spring portion connected to and extending from the first planar inner surface;
a second spring portion connected to and extending from the first planar inner surface, the second spring portion being separate from and arranged proximate to the first spring portion.

7. The clasp as recited in claim 6, wherein the second buckle portion comprises at least one slot, wherein the first spring portion and the second spring portion are displaceable toward each other to engage the at least one slot.

8. The clasp as recited in claim 1, further comprising a spring including a first end connected to the inferior component and a second end connected to the superior component, the spring operatively arranged to urge the clasp toward the fully closed position.

9. The clasp as recited in claim 1, wherein the first buckle portion comprises a tension hook operatively arranged to engage the second outer surface to secure the superior component to the inferior component.

10. The clasp as recited in claim 9, wherein the tension hook comprises a protrusion operatively arranged to engage a notch on the second outer surface.

11. A cooler comprising a lateral wall and at least one clasp connected to the lateral wall for securing a bag therein, the at least one clasp, comprising:
an inferior component fixedly secured to the lateral wall, including:
a first surface;
a first completely planar pad connected to the first surface; and,
a first buckle portion connected to the first surface; and,
a superior component pivotable relative to the inferior component, the superior component including:
a second surface;
a third surface parallel to the second surface;
a second completely planar pad connected to the second surface; and,
a second buckle portion operatively arranged to engage the first buckle portion and secure the superior component to the inferior component;
wherein in a fully closed position, the first pad and the second pad form a clamp for securing the bag.

12. The cooler as recited in claim 11, wherein:
the inferior component further comprises at least one flange having a first through-bore;
the superior component further comprises a hinge portion having a second through-bore; and,
a first pin engages the first and second through-bores to hingedly connect the superior component with the inferior component.

13. The cooler as recited in claim 11, wherein the first buckle portion comprises a tension buckle pivotably connected to the inferior component, the tension buckle including an enlarged portion.

14. The cooler as recited in claim 13, wherein the enlarged portion is arranged to engage the third surface.

15. The cooler as recited in claim 11, wherein:
the first buckle portion comprises:
a first spring portion including a first ramp;
a second spring portion including a second ramp, the first and second ramps being angled toward each other;
the second buckle portion comprises a slot extending from the second surface to the third surface; and,
the slot is arranged to engage the first and second ramps and elastically displace the first and second spring portions toward each other.

16. The cooler as recited in claim 11, further comprising a spring including a first end connected to the inferior component and a second end connected to the superior component, the spring operatively arranged to urge the clasp toward the fully closed position.

17. A cooler, comprising:
a floor;
a lateral wall; and,
a plurality of clasps operatively arranged to secure a bag, wherein each clasp of the plurality of clasps comprises:
an inferior component fixedly secured to the lateral wall, including:
a first inner surface;
a first completely planar pad connected to the first inner surface; and,
a first buckle portion fixedly secured to the first inner surface; and,
a superior component pivotably connected to the inferior component, the superior component including:
a second inner surface;
a second completely planar pad connected to the second inner surface; and,
a second buckle portion operatively arranged to engage the first buckle portion and secure the superior component to the inferior component;
wherein in a fully closed position, the first pad and the second pad form a clamp for securing the bag.

18. The cooler as recited in claim 17, wherein:
the lateral wall comprises a bottom edge connected to the floor and a top edge; and,
each clasp is arranged parallel with the top edge.

19. The cooler as recited in claim 17, wherein the first buckle portion extends perpendicularly from the first inner surface.

* * * * *